(12) United States Patent
Rabhi (10) Patent No.: US 10,634,246 B2
(45) Date of Patent: Apr. 28, 2020

(54) HYDRAULIC PISTON WITH COOLING AND LUBRICATION VALVE

(71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 0 days.

(21) Appl. No.: 16/115,771

(22) Filed: Aug. 29, 2018

(65) Prior Publication Data

US 2019/0072181 A1 Mar. 7, 2019

Related U.S. Application Data

(60) Provisional application No. 62/554,228, filed on Sep. 5, 2017.

(51) Int. Cl.

| | | |
|---|---|---|
| F16J 1/08 | (2006.01) | |
| F03C 1/28 | (2006.01) | |
| F03C 1/06 | (2006.01) | |
| F16K 15/02 | (2006.01) | |
| F04B 1/2014 | (2020.01) | |
| F16J 9/12 | (2006.01) | |
| F04B 1/124 | (2020.01) | |
| F04B 53/08 | (2006.01) | |
| F04B 53/18 | (2006.01) | |
| F04B 53/12 | (2006.01) | |
| F04B 53/14 | (2006.01) | |

(52) U.S. Cl.
CPC ............... *F16J 1/08* (2013.01); *F03C 1/0605* (2013.01); *F03C 1/0644* (2013.01); *F04B 1/124* (2013.01); *F04B 1/2014* (2013.01); *F04B 53/08* (2013.01); *F04B 53/12* (2013.01); *F04B 53/143* (2013.01); *F04B 53/18* (2013.01); *F16J 9/12* (2013.01); *F16K 15/026* (2013.01)

(58) Field of Classification Search
CPC ......... F03C 1/0605; F03C 1/0652; F01P 3/06; F04B 1/124; F04B 53/166; F04B 1/2035; F04B 53/18; F04B 53/08; F16J 1/08
See application file for complete search history.

(56) References Cited

U.S. PATENT DOCUMENTS

| | | | | |
|---|---|---|---|---|
| 2,968,287 A | * | 1/1961 | Creighton | F01B 1/0644 92/156 |
| 3,216,333 A | * | 11/1965 | Thoma | F01B 3/0085 92/110 |
| 3,828,654 A | * | 8/1974 | Wiethoff | F04B 1/124 91/488 |
| 3,861,278 A | * | 1/1975 | Forster | F04B 1/124 92/57 |
| 4,191,095 A | * | 3/1980 | Heyl | B23P 15/10 91/488 |

(Continued)

*Primary Examiner* — Abiy Teka
(74) *Attorney, Agent, or Firm* — Young & Thompson (57) ABSTRACT

The hydraulic piston forms a hydraulic chamber with a cylinder and has a cylindrical body which receives a seal and whose external cylindrical surface is housed with little clearance in the cylinder in such a manner as to leave an interstitial space, the cylindrical body being run through by a cooling and lubrication pipe which can be opened or closed by a cooling and lubrication valve which is moved by translation by a valve-actuator in such a manner that fluid can pass via a flow calibration opening from the hydraulic chamber to the interstitial space when the pressure existing in the hydraulic chamber is low and cannot pass when the pressure in the chamber is high.

14 Claims, 6 Drawing Sheets

(56) References Cited

U.S. PATENT DOCUMENTS 4,852,463 A * 8/1989 Wagenseil .............. F04B 1/124
                                                              91/488
6,732,633 B1 * 5/2004 Betz ........................ F04B 1/124
                                                              92/172

* cited by examiner

HYDRAULIC PISTON WITH COOLING AND LUBRICATION VALVE

The present invention relates to a hydraulic piston with cooling and lubrication valve, said piston cooperating with a cylinder in order to form, for example, the hydraulic chamber of variable volume of a pump or of a hydraulic motor with axial or radial pistons.

The seal of the pistons of the hydraulic pumps and motors with axial or radial pistons is usually obtained by leaving a small diametrical clearance between said pistons and the cylinder with which they cooperate. For example, said clearance can have a value of twenty to forty micrometers for a piston having a diameter of twenty millimeters. Such a small diametrical clearance usually makes it possible to obtain acceptable tightness levels up to operating pressures on the order of three to five hundred bars, provided sufficient overlap between the piston and the cylinder in which said piston moves by translation is provided.

Providing a small diametrical clearance between the piston and its cylinder constitutes a simple and robust sealing solution. The manufacturing cost price of said solution moreover remains moderate, in spite of the high machining precision that it requires.

One notes that the pistons of the hydraulic pumps and motors with axial pistons usually end with articulated shoes which slide on an inclined or inclinable plate depending on whether said pumps or said motors are fixed or variable displacement motors. When said plate is inclined and a pressure is applied to any one of the pistons by any hydraulic fluid—for example, by oil—, the force that the articulated shoe of said piston exerts on said plate produces by reaction a radial force between said piston and the cylinder with which it cooperates.

Said radial force generates a contact pressure between said piston and its cylinder. Said pressure is applied, for the first part, at the level of the end of said piston which is opposite the articulated shoe and, for the second part, at the level of the end of said cylinder which opens in the direction of the inclined plate.

The pistons of the hydraulic pumps and motors that have just been described are responsible for energy losses of various types, which reduce the total energy efficiency of said pumps and of said motors.

Among said energy losses, one distinguishes firstly hydraulic fluid leaks. Due to the effect of the pressure, hydraulic fluid is in fact expelled from the hydraulic chamber via the space formed by the diametrical clearance left between the piston and the cylinder, then it escapes at the level of the end of the cylinder which opens in the direction of the inclined plate. Moreover, one notes that by performing backward and forward movements in its cylinder, the piston produces a pump effect at the level of the diametrical clearance left between it and said cylinder, which increases the hydraulic leakage rate.

The shearing of the hydraulic fluid which is inserted between the piston and the cylinder is also included among said energy losses. Said shearing produces a resistant force which opposes the rotation of the pump or of the hydraulic motor. This shearing force is greater the more viscous the hydraulic fluid is, on the one hand, and the smaller the diametrical clearance left between the piston and the cylinder is, on the other hand.

Finally, said energy losses also originate from the force which the piston shoe exerts on the inclined plate. Said force results in radial forces exerted by the piston on its cylinder. In conjugation with the movement of said piston in said cylinder, said radial forces generate energy losses which are the product of said forces times the coefficient of friction between the piston and its cylinder, multiplied by the distance traveled by said piston in said cylinder.

As is easily understood upon reading the above, in order to reduce the total energy loss produced by the pistons of the hydraulic pumps and motors, one must seek to achieve, at the very least, the three fold objective of limiting the hydraulic leaks as much as possible, of reducing the losses due to shearing of the hydraulic fluid as much as possible, and of minimizing the losses due to friction, which are produced at the level of the contacts between the piston and its cylinder.

Nevertheless, various contradictions exist, which are in conflict with the simultaneous pursuit of these three objectives.

Indeed, in the state of art technology, reducing the hydraulic fluid leaks cannot occur by further reducing the diametrical clearance left between the piston and its cylinder, since the losses due to shearing would increase unacceptably.

In fact, these increased losses due to shearing would result in an increased amount of heat emitted in a smaller volume of hydraulic fluid held in the diametrical clearance left between the piston and its cylinder. This situation would result in a drastic increase of the temperature of said fluid, while the viscosity thereof would decrease. Said fluid would lose much of its lubricating properties, which would increase the losses due to friction, which in turn would further increase the amount of heat received by the hydraulic fluid held in the diametrical clearance.

The consequence would then be runaway heat emissions and a runaway increase in the local temperature of the hydraulic fluid, entailing, beyond a certain threshold, destruction by cokefaction of said fluid held in the diametrical clearance left between the piston and its cylinder. In addition, the temperature of the piston could increase to the point that said piston dilates more rapidly than the cylinder in which it moves by translation. This last effect would lead to seizure of said piston in said cylinder.

Consequently, it would be difficult to reduce the diametrical clearance left between the piston and its cylinder in order to reduce the leaks of hydraulic fluid, particularly since, in order to reduce the losses due to shearing, said clearance, on the contrary, would have to be increased. In fact, the losses due to shearing increase approximately inversely proportionally to said clearance.

In addition to reducing the losses due to shearing, increasing said clearance would also reduce the losses due to friction, which are induced by the radial forces exerted by the piston on its cylinder. Indeed, a reasonable increase in the diametrical clearance left between the piston and the cylinder would promote the formation and the maintenance of a hydrodynamic lubrication regime between said piston and said cylinder, in particular since the film of hydraulic fluid—in the case of oil, for example—would be thicker, and since the latter would be maintained at lower temperature.

However, increasing the diametrical clearance between the piston and its cylinder is also not the solution, since this would affect the hydraulic leaks flowing between these two parts. Said leaks would increase drastically.

Since the objectives which have just been described are contradictory in terms of their implementation, the diametrical clearance between the pistons and the cylinders of the hydraulic pumps and motors with axial or radial pistons according to the prior art results from a compromise between the hydraulic leaks, on the one hand, and the losses due to shearing of oil and due to mechanical friction, on the other hand.

One could imagine avoiding this compromise by placing a gasket on the piston either at the end of said piston that is closest to the hydraulic chamber, or in its center taking care to ensure that said gasket can never leave the cylinder. Thus, it would be possible to have a large diametrical clearance between the piston and its cylinder, since the seal would no longer depend on the clearance.

The problem with any gasket or sealing segment is that the piston is no longer lubricated sufficiently in its cylinder, since an insufficient amount of oil is introduced into the space formed by the diametrical clearance left between the piston and its cylinder.

Moreover, said oil has to be replaced continually in order to evacuate the heat emitted by the leaks, the losses due to shearing, and the residual losses due to friction. Installing a tight seal on the pistons of the hydraulic pumps and motors with axial or radial pistons thus inevitably leads to drying of the cylinder and this leads potentially to seizure of the piston in said cylinder and to premature aging of the hydraulic fluid locally subjected to excessive temperatures.

Moreover, one notes that certain pumps or certain hydraulic motors comprise mechanical parts which are positioned opposite the hydraulic chamber and which are entirely or partially lubricated and/or cooled as a result of the leakage rate between the piston and the cylinder. Preventing any leakage of hydraulic fluid between the piston and its cylinder would thus lead to the need to lubricate said parts by deliberate supply of oil, for example, by means of an injector.

It is for the purpose of solving these different problems that the hydraulic piston with cooling and lubrication valve according to the invention makes it possible, depending on its embodiment:

To mount a gasket or sealing segment between the piston and its cylinder, said gasket stemming the leaks of hydraulic fluid that occur at the level of the diametrical clearance left between said piston and said cylinder, particularly when a high pressure exists in the hydraulic chamber of the hydraulic pump or of the hydraulic motor which receives it, said mounting no longer having a negative effect—in comparison with the prior art—on the proper lubrication of said piston in said cylinder;

To allow flow of a high leakage rate of lubricating and cooling oil at the level of the diametrical clearance between the piston and its cylinder only when a low pressure exists in the hydraulic chamber of the hydraulic pump or of the hydraulic motor which receives it, said low pressure being, for example, the pressure commonly referred to as "boost pressure;"

To optimize the diametrical clearance left between the piston and its cylinder in order to minimize the losses due to shearing and due to friction by only marginally increasing the energy losses associated with the hydraulic fluid leaks flowing through the diametrical clearance left between said piston and said cylinder;

To significantly increase the yield of any hydraulic pump or hydraulic motor which receives it;

To increase only very marginally the production cost price of the pump or of the hydraulic motor which receives it.

It is understood that, in addition to its use with hydraulic pumps and hydraulic motors with axial or radial pistons, the hydraulic piston with cooling and lubrication valve according to the invention can be used with any other pump, motor, motor-pump, jack or apparatus of any form or type, whether these devices or apparatuses are hydraulic or pneumatic, and provided that the configuration of said components or apparatuses makes it possible to advantageously operate said piston according to the invention.

The other features of the present invention are described in the description and in the secondary claims which are directly or indirectly dependent on the main claim.

The hydraulic piston consists of a cylindrical body which exposes an external cylindrical surface housed with little clearance in a cylinder in such a manner as to leave an interstitial space between said surface and said cylinder, said piston being capable of moving by translation in said cylinder with which it forms a hydraulic chamber of variable volume, a first end of said piston having a compression face leading into the hydraulic chamber in order to receive the pressure of a fluid, while the other end of said piston has a piston support face in order to exert a force on transmission means.

The hydraulic piston according to the present invention includes:

Sealing means arranged on the external cylindrical surface, said means being capable of forming a seal with the cylinder;

At least one cooling and lubrication pipe which is arranged entirely or partially in the cylindrical body, said pipe starting, on the one hand, with a pipe inlet which communicates directly or indirectly with the hydraulic chamber, and ending, on the other hand, with a pipe outlet which opens directly or indirectly at the level of the external cylindrical surface, the fluid being capable of circulating in said pipe from said inlet to said outlet when the pressure existing in the hydraulic chamber is greater than the pressure existing in the interstitial space, while the sealing means prevent said fluid from passing through the exterior of the cylindrical body in order to run from said inlet to said outlet;

At least one cooling and lubrication valve housed entirely or partially in the cooling and lubrication pipe and which can open or close in order to respectively allow or prevent the circulation of the fluid in said pipe, said valve comprising a flow seal seat which can either remain at a certain distance from a valve contact surface arranged in the interior or at the end of the cooling and lubrication pipe in order to allow the fluid to pass or can be maintained in contact with said surface in order to form with the latter a sealing contact line which prevents the passage of said fluid;

At least one valve-actuator piston which is rigidly connected to the cooling and lubrication valve in such a manner as to be able to maneuver the latter for closing and/or opening, said piston being housed with little clearance in an actuator cylinder arranged in or on the cylindrical body, said piston being capable of moving by longitudinal translation in said cylinder and having a high-pressure face exposed to the pressure existing in the hydraulic chamber, while, opposite said high-pressure face, said piston has a low-pressure side face which communicates directly or indirectly with the interstitial space or with the piston support face or with the two;

At least one flow calibration opening which limits the maximum flow of fluid which can circulate in the cooling and lubrication pipe, said opening being placed—in the path of the fluid—in series with the cooling and lubrication valve and in parallel with the valve-actuator;

At least one valve return spring which tends to move the flow seal away from the valve contact surface;

At least one valve stop spacer which sets the maximum distance of separation of the flow seal seat with respect to the valve contact surface.

The hydraulic piston according to the present invention includes a valve return spring which is entirely or partially housed in the interior of an intermediary chamber for fluid formed between the valve-actuator piston and the sealing contact line.

The hydraulic piston according to the present invention includes sealing means which consist of at least one cut segment housed in at least one sealing groove arranged in the cylindrical body and opening on the external cylindrical surface.

The hydraulic piston according to the present invention includes sealing means which consist of at least one flexible circular gasket housed in at least one sealing groove arranged in the cylindrical body and opening on the external cylindrical surface.

The hydraulic piston according to the present invention includes an anti-shearing clearance groove which is arranged in the cylindrical body, said groove opening on the external cylindrical surface.

The hydraulic piston according to the present invention includes a diameter of the axial end of the cylindrical body located on the side of the compression face which decreases gradually over a certain length in order to form a bearing taper.

The hydraulic piston according to the present invention includes a diameter of the axial end of the cylinder located opposite the hydraulic chamber which increases gradually over a certain length in order to form a bearing enlargement.

The hydraulic piston according to the present invention includes a flow calibration opening which is arranged in the interior of the valve-actuator piston of which it connects the high-pressure face and the low-pressure side face or either of said two faces with the external cylindrical surface of said piston.

The hydraulic piston according to the present invention includes a flow calibration opening which consists of the clearance left between the valve-actuator piston and the actuator cylinder with which said piston cooperates.

The hydraulic piston according to the present invention includes a cylindrical body which is run through entirely in the direction of its length by a pipe for lubrication of the transmission means which opens, on the one hand, on the compression face and, on the other hand, on the piston support face.

The hydraulic piston according to the present invention includes a cooling and lubrication valve and a valve-actuator piston which are made of the same block of material in order to form a valve-actuator piston assembly.

The hydraulic piston according to the present invention includes a valve-actuator piston assembly which is run through entirely in the axial direction by the pipe for lubrication of the transmission means around which it can slide while forming a seal with the latter.

The hydraulic piston according to the present invention includes a valve-actuator piston assembly which is run through entirely in the axial direction by the pipe for lubrication of the transmission means, said assembly forming a portion of said pipe.

The hydraulic piston according to the present invention includes a valve-actuator piston assembly which ends with a sliding sealing end-piece which forms a seal with an end-piece receiving cylinder arranged in the pipe for lubrication of the transmission means, said sealing end-piece enabling said assembly to move by longitudinal translation with respect to said pipe.

The following description in reference to the appended drawings which are non-limiting examples will make it possible to better understand the invention, the features which it presents, and the advantages which it is capable of procuring.

DESCRIPTION OF THE INVENTION

Figure 1:
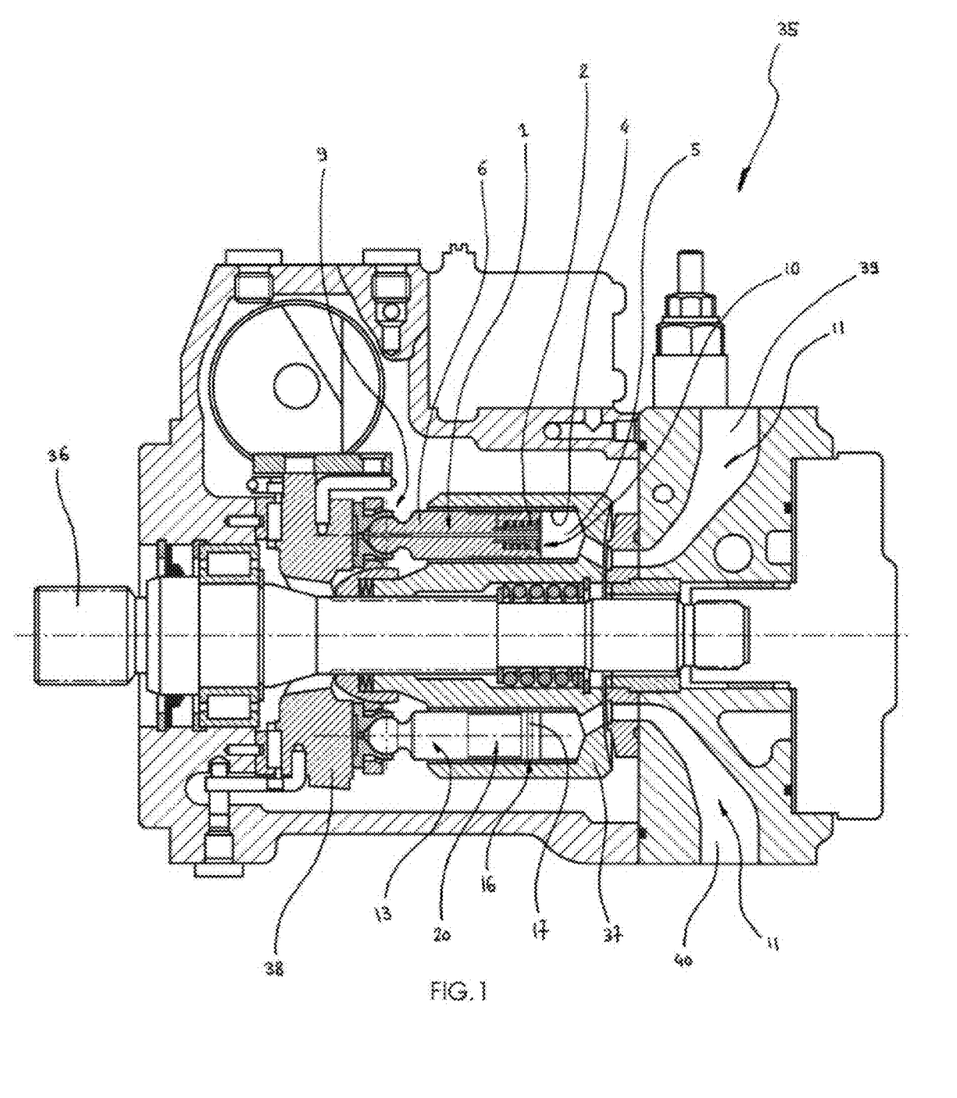
FIG. 1 is a diagrammatic cross-section of a hydraulic pump with variable-displacement axial pistons equipped with hydraulic pistons with cooling and lubrication valve according to the invention.
Figures 8, 9:
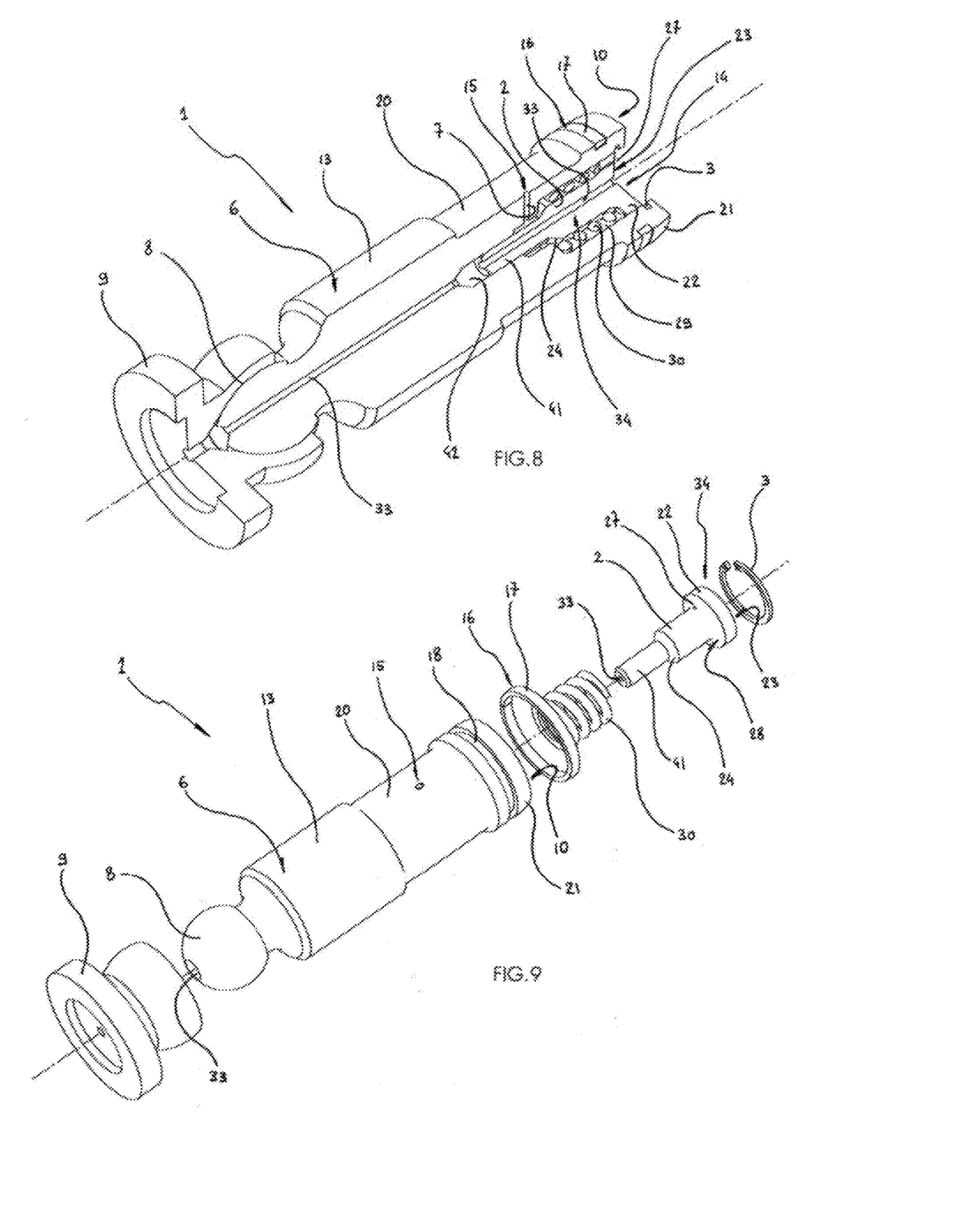
FIG. 8 is a three-dimensional exploded view of the hydraulic piston with cooling and lubrication valve according to the invention and according to a variant thereof as represented in FIGS. 3 and 4, said piston being assembled.
FIG. 9 is an exploded three-dimensional view of the hydraulic piston with cooling and lubrication valve according to the invention and according to a variant thereof as represented in FIGS. 3 and 4.

FIGS. 1 and 9 represent the hydraulic piston 1 with cooling and lubrication valve 2, various details of its components, its variants and its accessories.

Figure 2:
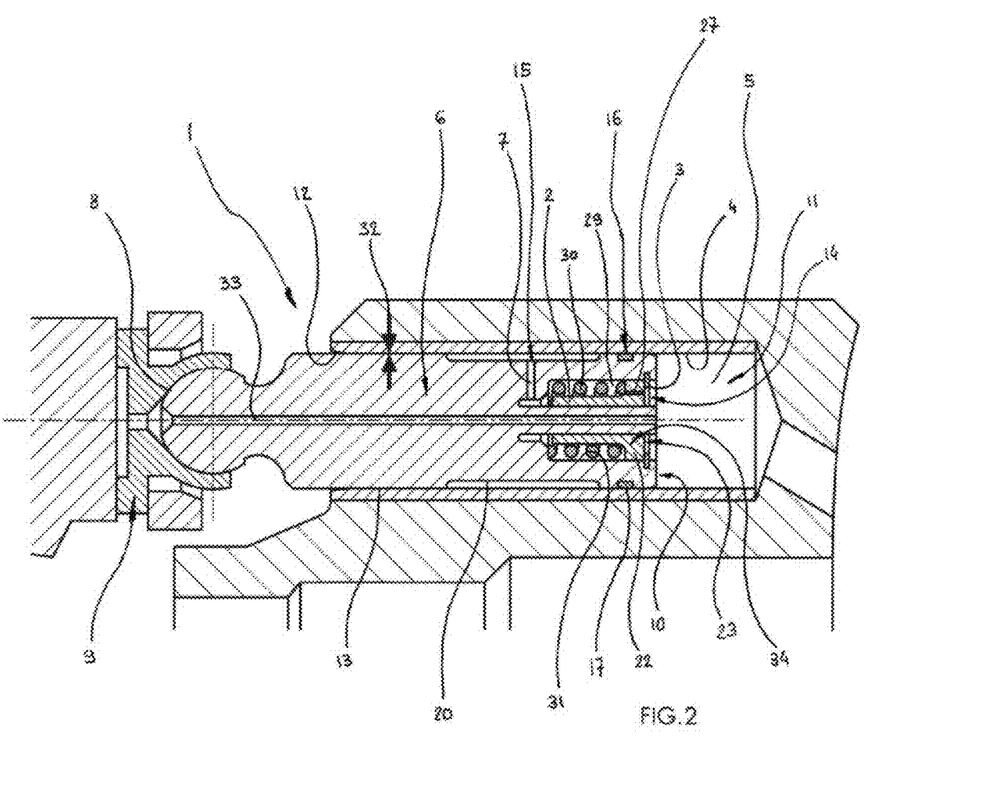
FIG. 2 is a diagrammatic cross-section of the hydraulic piston with cooling and lubrication valve according to the invention, of which the valve-actuator piston assembly is run through entirely in the axial direction by the pipe for lubrication of the transmission means around which it can slide while forming a seal with the latter.

As one can see in particular in FIGS. 1 and 2, the hydraulic piston 1 consists of a cylindrical body 6 which presents an external cylindrical surface 13 housed with little clearance in a cylinder 4 in such a manner as to leave an interstitial space 32 between said surface 13 and said cylinder 4, said piston 1 being capable of moving by translation in said cylinder 4, with which it forms a hydraulic chamber 5 of variable volume.

One notes in particular in FIGS. 1 and 2 that a first end of a the hydraulic piston 1 has a compression face 10 leading into the hydraulic chamber 5 in order to receive the pressure of a fluid 11, while the other end of said piston 3 has a piston support face 8 in order to exert a force on transmission means 9.

FIGS. 1 to 9 illustrate that the hydraulic piston 1 with cooling and lubrication valve 2 according to the invention includes sealing means 16 arranged on the external cylindrical surface 13, said means 16 being capable of forming a more or less perfect seal with the cylinder 4 and being arranged preferably on the portion of the external cylindrical surface 13 which is close to the hydraulic chamber 5.

One notes that the sealing means 16 can consist simply of a local reduction of the interstitial space 32 obtained by a local increase in the diameter of the external cylindrical surface 13. Said increase can be non-cylindrical and assume, for example, the shape of a bulge or of a bulb which is articulated in the cylinder 4 which receives it.

In particular in FIGS. 2 to 8, one can see that the hydraulic piston 1 with cooling and lubrication valve 2 according to the invention includes at least one cooling and lubrication pipe 7 which is entirely or partially arranged in the cylindrical body 6, said pipe 7 starting, on the one hand, with a pipe inlet 14 which communicates directly or indirectly with the hydraulic chamber 5, and ending, on the other hand, with a pipe outlet 15 which opens directly or indirectly at the level of the external cylindrical surface 13.

It should be noted that the fluid 11 can circulate in said pipe 7 from said inlet 14 to said outlet 15 when the pressure existing in the hydraulic chamber 5 is greater than the pressure existing in the interstitial space 32, while the sealing means 16 prevent said fluid 11 from passing through the exterior of the cylindrical body 6 to go from said inlet 14 to said outlet 15 when said means 16 form a seal with the cylinder 4.

In FIGS. 1 to 9, it is shown that the hydraulic piston 1 with cooling and lubrication valve 2 according to the invention includes at least one cooling and lubrication valve 2 housed entirely or partially in the cooling and lubrication pipe 7 and which can open or close in order to respectively allow or prevent the circulation of the fluid 11 in said pipe 7.

Figure 4:
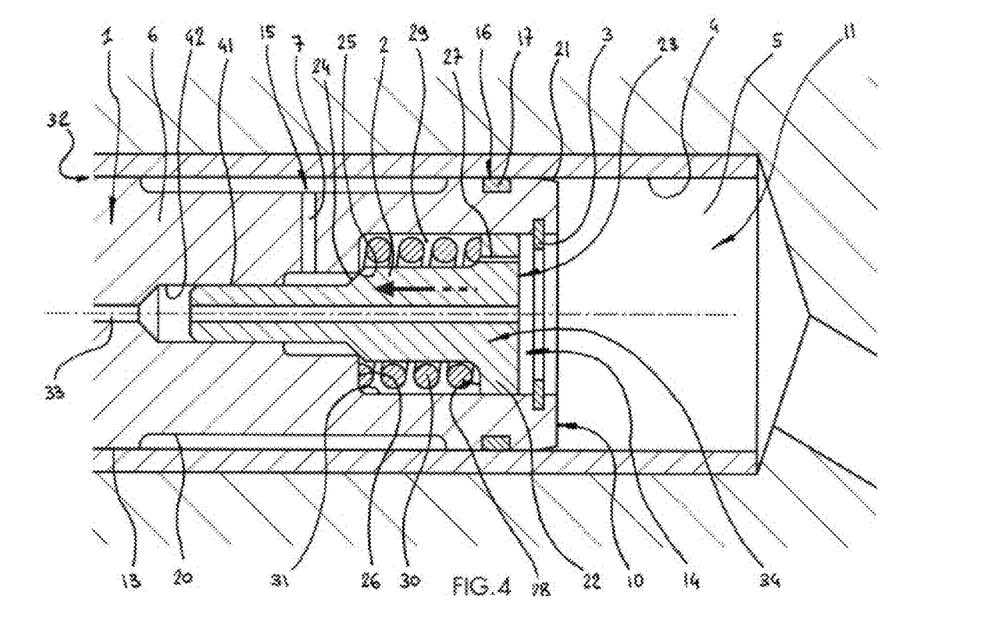

According to the invention, the cooling and lubrication valve 2 comprises a flow seal seat 24 which can either remain at a certain distance from a valve contact surface 26 arranged in the interior or at the end of the cooling and lubrication pipe 7 in order to allow the fluid 11 to pass or to be maintained in contact with said surface 26 in order to form with the latter a sealing contact line 25 which prevents the passage of said fluid 11, said line 25 being shown in FIG. 4.

One notes—in particular in FIGS. 2 to 9—that the hydraulic piston 1 with cooling and lubrication valve 2 according to the invention includes at least one valve-actuator piston 22 which is rigidly connected to the cooling and lubrication valve 2 in such a manner as to be capable of maneuvering the latter for closing and/or opening. Said piston 22 is housed with little clearance in an actuator cylinder 31 arranged in or on the cylindrical body 6 and can move by longitudinal translation in said cylinder 31.

In FIGS. 3 to 7 and in FIG. 9, one notes that the valve-actuator piston 22 has a high-pressure face 23 exposed to the pressure existing in the hydraulic chamber 5, while opposite said high-pressure face 23, said piston 22 has a low-pressure side face 28 which communicates directly or indirectly either with the interstitial space 32 or with the piston support face 8 or with the two 32, 8.

One notes that the valve-actuator piston 22 or the actuator cylinder 31 can comprise a gasket of any type known to the person skilled in the art in order to improve the seal formed between said piston 22 and said cylinder 31.

In FIGS. 2 to 9, one clearly sees that the hydraulic piston 1 with cooling and lubrication valve 2 according to the invention comprises at least one flow calibration opening 27 which limits the maximum flow rate of 11 which can circulate in the cooling and lubrication pipe 7.

The flow calibration opening 27 is placed—in the path of the fluid 11—in series with the cooling and lubrication valve 2 and in parallel with the valve-actuator piston 22; that is to say, with respect to the direction of flow of the fluid 11 in the cooling and lubrication pipe 7, said opening 27 is placed before or after the cooling and lubrication valve 2, while the passage of fluid 11 through said opening 27 is in no way affected by the position of the valve-actuator piston 22, to the extent that said opening 27 allows said fluid 11 either to bypass or to pass through said piston 22.

In particular in FIGS. 2 to 9, one can see that the hydraulic piston 1 with cooling and lubrication valve 2 according to the invention comprises at least one valve return spring 30 which tends to distance the flow seal seat 24 from the valve contact surface 26, wherein said spring 30 can be a helical spring, a torsion spring, a tension spring or a resilient washer of any type, and, in general, it can be of any type known to the person skilled in the art.

In the same FIGS. 2 to 9, one can also see in particular that the hydraulic piston 1 with cooling and lubrication valve 2 according to the invention has at least one valve stop spacer 3 which sets the maximum distance of separation of the flow seal seat 24 with respect to the valve contact surface 26.

The valve stop spacer 3 can in particular cooperate with any constitutive portion of the cooling and lubrication valve 2 or of the valve-actuator piston 22 with which it cooperates. One also notes that said stop spacer 3 can consist, for example, of a circlip housed in a groove arranged in the actuator cylinder 31, the valve-actuator piston 22 being capable of coming in contact with said circlip.

Depending on the variants of the hydraulic piston 1 with cooling and lubrication valve 2 shown in FIGS. 1 to 9, one notes that the valve return spring 30 can be entirely or partially housed in the interior of an intermediate fluid chamber 29 formed between the valve-actuator piston 22 and the sealing contact line 25.

In FIGS. 1 to 5 and 7 to 9, one notes that the sealing means 16 can consist of at least one cut segment 17 housed in at least one sealing groove 18 arranged in the cylindrical body 6 and opening on the external cylindrical surface 13.

Figure 6:
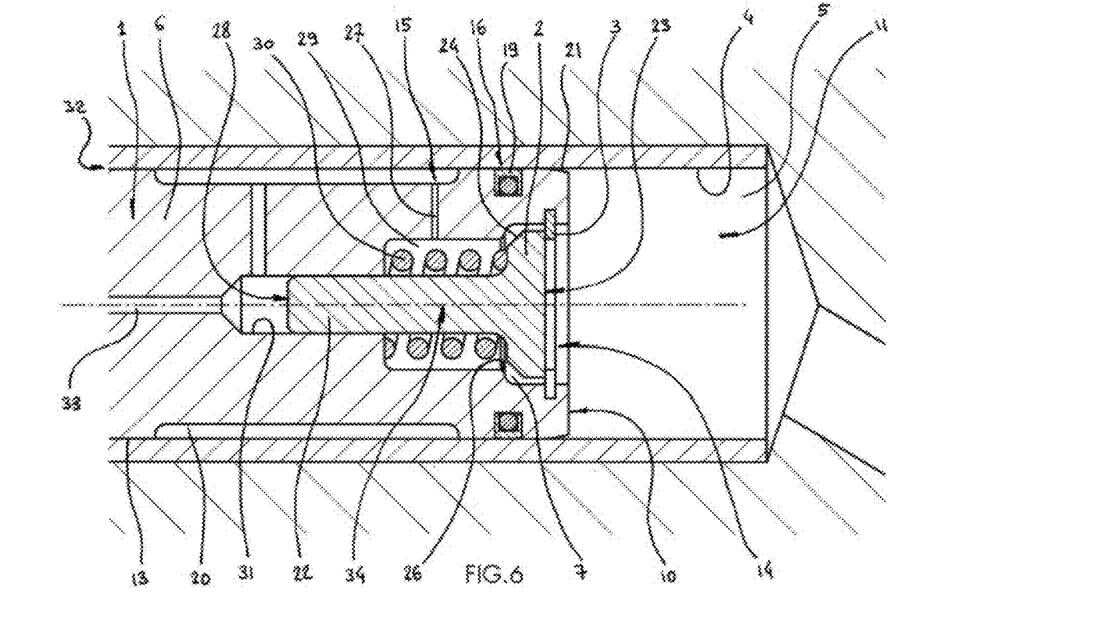
FIG. 6 is a diagrammatic cross-sectional view of the hydraulic piston with cooling and lubrication valve according to the invention, of which the low-pressure face of the valve-actuator piston is located downstream of the sealing contact line with respect to the direction of flow of the fluid.
Figure 7:
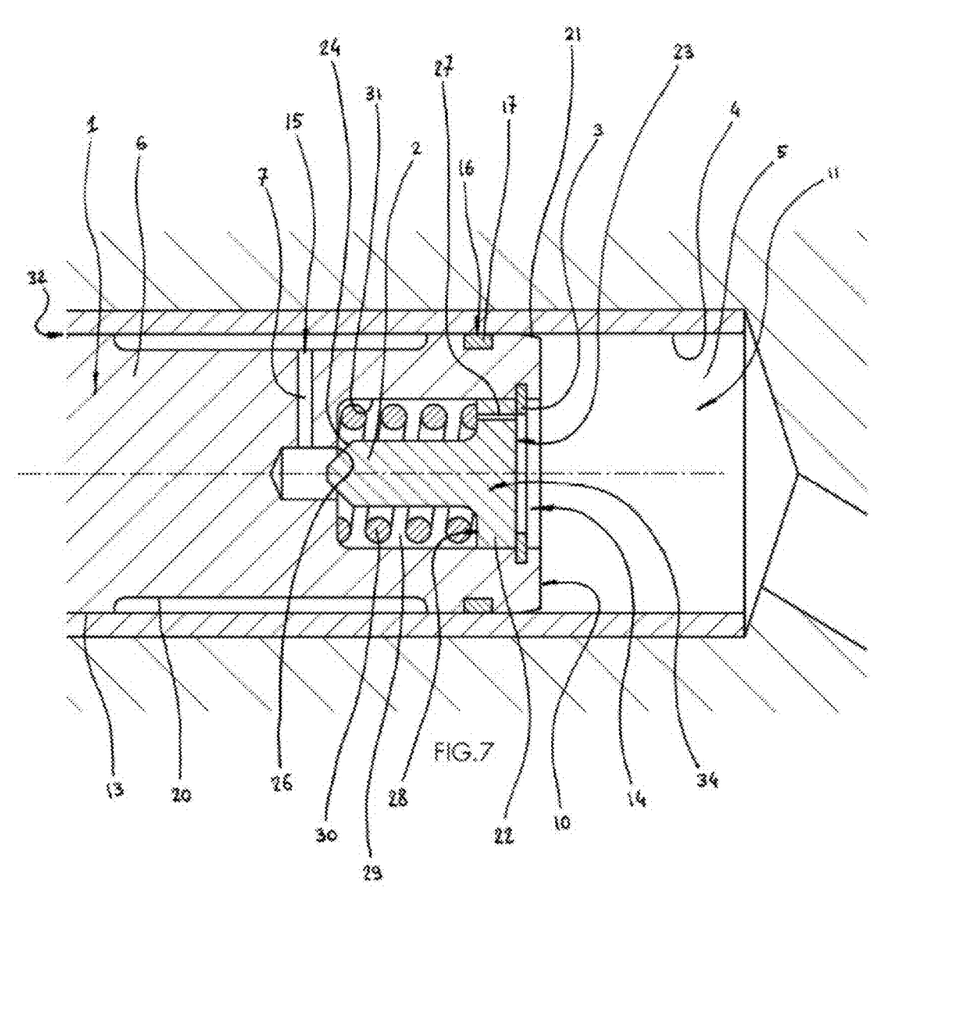
FIG. 7 is a diagrammatic cross-sectional view of the hydraulic piston with cooling and lubrication valve according to the invention, without pipe for lubrication of the transmission means.

In a variant illustrated in FIG. 6, the sealing means 16 can also consist of at least one flexible circular gasket 19 housed in at least one sealing groove 18 arranged in the cylindrical body 6 and opening on the external cylindrical surface 13.

One notes that the flexible circular gasket 19 can be made, for example, from an O ring made of an elastomer or it can be of the composite type, consisting in particular of an O ring made of an elastomer which cooperates with a ring made of plastic material with or without a filler of anti-friction and/or anti-abrasion particles.

FIGS. 1 to 9 show that advantageously an anti-shearing clearance groove 20 can be provided in the cylindrical body 6, said groove 20 opening on the external cylindrical surface 13.

According to this particular configuration, the portions of the external cylindrical surface 13 which are located axially before and after the anti-shearing clearance groove 20 may not have exactly the same diameter. For example, the portion which includes the sealing means 16 can have a substantially larger diameter than the portion without sealing means 16.

In another variant of the hydraulic piston 1 with cooling and lubrication valve 2, which can be seen in particular in FIGS. 3 to 9, one notes that the diameter of the axial end of the cylindrical body 6 located on the side of the compression face 10 can decrease gradually over a certain length in order to form a bearing taper 21 which, when the hydraulic piston 1 rises in the cylinder 4 in the direction of the hydraulic chamber 5, forces fluid 11 to penetrate between said axial end of the cylindrical body 6 and the cylinder 4 at the level of the contact between said end and said cylinder 4.

This particular configuration of the hydraulic piston 1 according to the invention promotes the establishment of a hydrodynamic lubrication regime at the level of said contact and it reduces the losses due to friction, which are generated by the displacement of the hydraulic piston 1 in the cylinder 4.

Alternatively or in a complementary manner, FIG. 2 shows that the diameter of the axial end of the cylinder 4 located opposite the hydraulic chamber 5 can gradually increase over a certain length in order to form a bearing enlargement 12 which, when the hydraulic piston 1 rises in the cylinder 4 in the direction of the hydraulic chamber 5, forces fluid 11 to penetrate between the cylindrical body 6 and said axial end of the cylinder 4 at the level of the contact between said end and said cylinder 4.

This particular configuration of the hydraulic piston 1 according to the invention also promotes the establishment of a hydrodynamic lubrication regime at the level of said contact and reduces the losses due to friction, which are generated by the displacement of the hydraulic piston 1 in the cylinder 4.

In FIGS. 2 to 5 and 7 to 9, one notes that the flow calibration opening 27 can be arranged in the interior of the valve-actuator piston 22 of which it connects the high-pressure face 23 and the low-pressure side face 28 or either of said two faces 23, 28 with the external cylindrical surface of said piston 22.

Alternatively, the flow calibration opening 27 can advantageously consist of the clearance left between the valve-actuator piston 22 and the actuator cylinder 31 with which said piston 22 cooperates. Moreover, one notes that said opening 27 can also consist of any clearance left between said piston 22 and any other part with which it could form a seal.

In another variant of the hydraulic piston 1 with cooling and lubrication valve 2 according to the invention, which can be seen in particular in FIGS. 2 to 6 and in FIGS. 8 and 9, the cylindrical body 6 can be run through entirely in the direction of its length by a pipe for lubrication of the transmission means 33 which opens, on the one hand, on the compression face 10 and, on the other hand, on the piston support face 8.

The pipe for lubrication of the transmission means 33 allows fluid 11 to be conveyed from the hydraulic chamber 5 to the transmission means 9 which can consist, for example, of hydraulic shoes cooperating with an inclinable plate 38.

FIGS. 1 to 9 illustrate that the cooling and lubrication valve 2 and the valve-actuator piston 22 can be produced of the same block of material in order to form a valve-actuator piston assembly 34.

Figure 5:
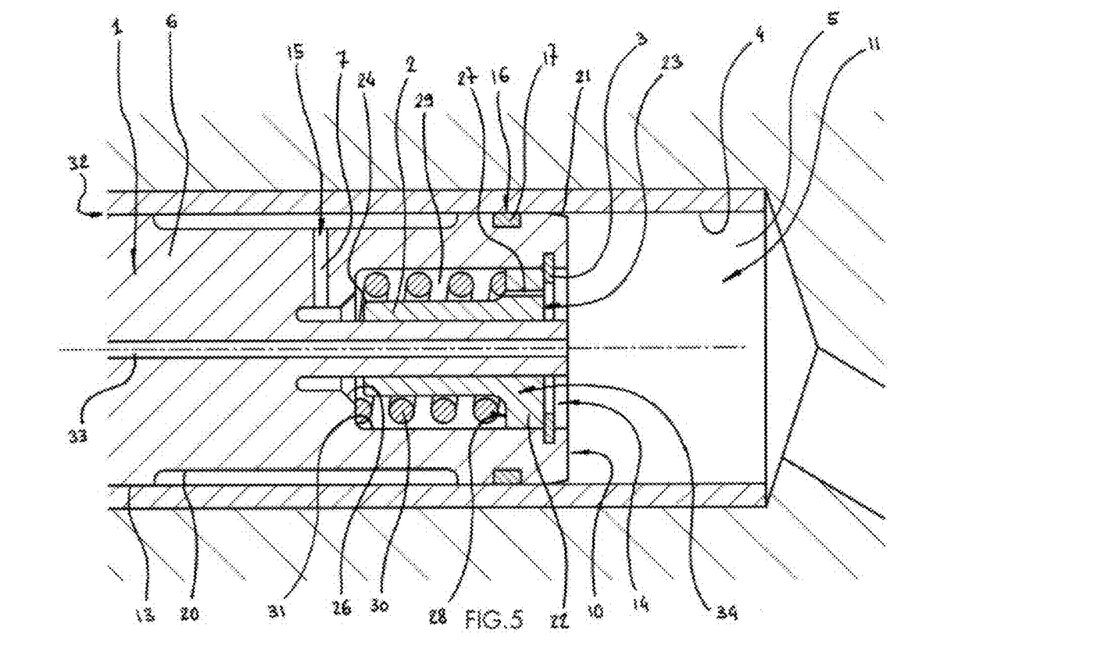
FIG. 5 is a diagrammatic cross-sectional detail view of the hydraulic piston with cooling and lubrication valve according to the invention and according to a variant thereof shown in FIG. 2.

FIG. 5 shows that the valve-actuator piston assembly 34 can be run through entirely in the axial direction by the pipe for lubrication of the transmission means 33 around which it can slide while forming a seal with the latter.

In an alternative shown in FIGS. 3, 4, 8 and 9, the valve-actuator piston assembly 34 can be run through entirely in the axial direction by the pipe for lubrication of the transmission means 33, said assembly 34 forming a portion of said pipe 33.

In these same figures, one notes that the valve-actuator piston assembly 34 can advantageously end with a sliding sealing end-piece 41 which forms a seal with an end-piece receiving cylinder 42 arranged in the pipe for lubrication of the transmission means 33, said sealing end-piece 41 allowing said assembly 34 to be moved by longitudinal translation with respect to said pipe 33.

One notes that the sliding sealing end-piece 41 or the end-piece receiving cylinder 42 can comprise a gasket of any type known to the person skilled in the art in order to improve the seal formed between said end-piece 41 and said cylinder 42.

Operation of the Invention:

The operation of the hydraulic piston 1 with cooling and lubrication valve 2 according to the invention is easily understood in view of FIGS. 1 to 9.

FIG. 1 shows the hydraulic piston 1 applied to a hydraulic pump with variable-displacement axial pistons 35 which is known per se.

When a transmission shaft 36 which is part of said pump 35 is set in rotation by a driving source which is not represented, said shaft 36 in turn drives a small cylinder 37 in rotation, the latter being firmly connected to said shaft 36.

When an inclinable plate 38 which is part of said pump 35 is inclined, the hydraulic pistons 1 of said pump 35 concomitantly perform back and forth movements in the cylinder 4 with which they cooperate. As a result of said back and forth movements said pistons 1 suction fluid 11 into an intake pipe 39 which is supplied with said fluid 11 at a low pressure referred to as "boost pressure" of twenty bars, for example, then they expel said fluid 11 into a delivery pipe 40 in which said fluid 11 is raised to a pressure of, for example, four hundred bars.

In order to explain the operation of the hydraulic piston 1 with cooling and lubrication valve 2 according to the invention, it is assumed here that the diametrical clearance left between the cylindrical body 6 of the hydraulic piston 1 and the cylinder 4 with which it cooperates is—as a non-limiting example—on the order of eighty to one hundred micrometers.

We emphasize that this clearance is significant greater than the clearance of on the order of twenty to forty micrometers which is usually left between the pistons and the cylinder 4, with which they cooperate, of the hydraulic pumps with variable-displacement axial cylinders 35 according to the prior art. Such a large clearance is one of the objectives of the hydraulic piston 1 with cooling and lubrication valve 2 according to the invention, with the intent of improving the total energy yield of the hydraulic pump with variable-displacement axial pistons 35 which is equipped with it, or the total energy yield of any other apparatus advantageously compatible with said piston 1.

In fact, the hydraulic piston 1 according to the invention allows that the diametrical clearance left between the cylindrical body 6 and the cylinder 4 is no longer determined by sealing requirements—on the contrary, some permeability is desirable—but primarily based on guiding criteria generating as little loss due to friction and wear as possible.

In order to explain the operation of the hydraulic piston 1 with cooling and lubrication valve 2 according to the invention, we assume here that, as illustrated in FIGS. 1 to 5 and 7 to 9, the sealing means 16 of each hydraulic piston 1 consist of a cut segment 17 housed in a sealing groove 18 arranged in the cylindrical body 6, said groove 18 opening on the external cylindrical surface 13.

One notes—in particular in FIGS. 3 to 5 and FIG. 7—the bulging profile of said segment 17, more precisely of the external surface of said segment 17 which is provided here so as to be kept held against the internal wall of the cylinder 4 due to the effect of the pressure of the fluid 11 which the hydraulic chamber 5 contains.

The cut segment 17 in question here passes successively from the "parked" state, when the pressure existing in the hydraulic chamber 5 is twenty bars, to the "in sealing contact with the cylinder 4" state, when the pressure existing in said chamber 5 is four hundred bars.

The advanced seal which the cut segment 17 forms with the cylinder 4 when the pressure existing in the hydraulic chamber 5 is four hundred bars allows very little fluid 11 to escape between said segment 17 and said cylinder 4.

Nevertheless, when the pressure existing in the hydraulic chamber 5 is only twenty bars and thus low, although said segment 17 is in fact parked, the residual seal which said segment 17 forms with the cylinder 4, combined with the small interstitial space 32 left between the external cylindrical surface 13 and the cylinder 4, allows only very little fluid 11 to escape from the hydraulic chamber 5 via said space 32.

Such a small amount of fluid 1 is insufficient to appropriately cool and lubricate the cylindrical body 6 at the level of its contact(s) with the cylinder 4. This situation would result in a drying of the cylinder 4 compromising its mechanical integrity, a drastic increase in the energy losses due to friction occurring at the level of the contact between the external cylindrical surface 13 and the cylinder 4, and a drastic deterioration of the energy yield and of the lifespan of the hydraulic pump with variable-displacement axial pistons 35. More fluid 11 is thus necessary than just the cut segment 17 in the "parked" state allows to pass.

Figure 3:
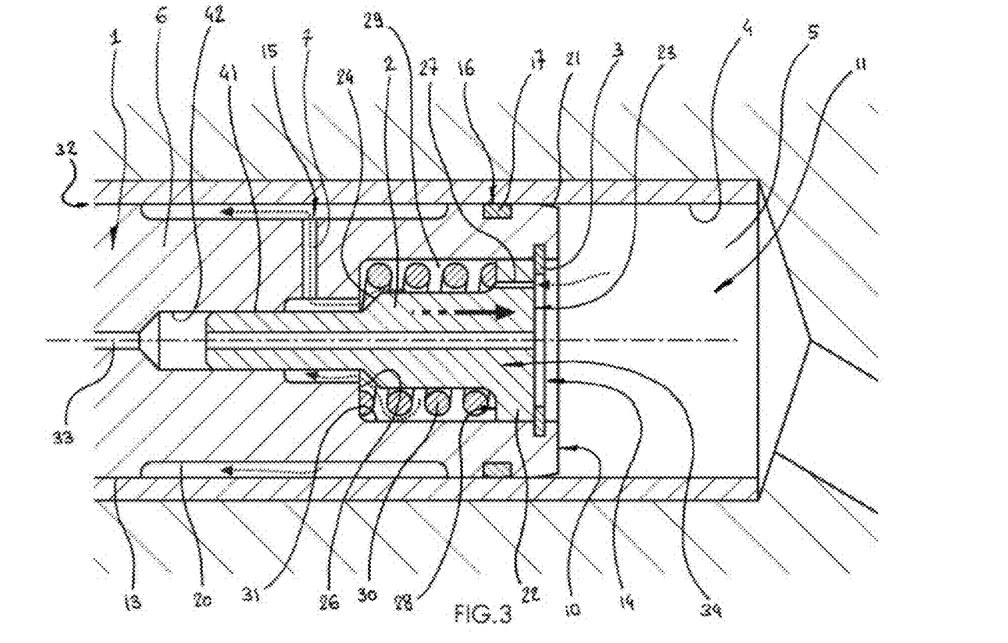
FIGS. 3 and 4 are diagrammatic cross-sectional detail views of the hydraulic piston with cooling and lubrication valve according to the invention, which illustrate the operation of said invention respectively when the pressure which exists in the hydraulic chamber is low, then high, the valve-actuator piston assembly being, on the one hand, run through in the axial direction by the pipe for lubrication of the transmission means to form a portion thereof, and ending, on the other hand, with a sliding sealing end-piece which forms a seal with an end-piece receiving cylinder arranged in said lubrication pipe.

This is the reason why—as illustrated in FIG. 3—, when the pressure existing in the hydraulic chamber 5 is low, the hydraulic piston 1 according to the invention is provided to allow additional fluid 11 to run directly from the hydraulic chamber 5 to the interstitial space 32, bypassing the cut segment 17.

In order to illustrate the operation of the hydraulic piston 1 with cooling and lubrication valve 2 according to the invention, which makes it possible to achieve this result, we will devote particular attention to FIGS. 3 and 4.

FIG. 3 shows the hydraulic piston 1 according to the invention, when the pressure of the fluid 11 contained in the hydraulic chamber 5 is only twenty bars, while FIG. 4 illustrates what happens to the operation of the invention when the pressure of said fluid 11 contained in said chamber 5 is four hundred bars.

We will assume that the hydraulic piston 1 with cooling and lubrication valve 2 according to the invention is used effectively in a hydraulic pump with variable-displacement axial pistons 35 as represented in FIG. 1.

As one can see in FIG. 3, the pressure existing in the hydraulic chamber 5 being twenty bars, the force produced by the valve return spring 30 on the low-pressure face 28 of the valve-actuator piston 22 is greater than the force produced by the pressure of the fluid 11 on the high-pressure face 23.

It results from this situation that the valve-actuator piston assembly 34 remains in contact with or in proximity to the valve stop spacer 3 with which it cooperates, and that the flow seal seat 24 remains at a distance from the valve contact surface 26. Consequently, fluid 11 can circulate in the cooling and lubrication pipe 7 in order to run from the hydraulic chamber 5 to the annular cavity which forms the anti-shearing clearance groove 20 with the cylinder 4.

For this purpose, said fluid 11 first runs through the flow calibration opening 27, then into the intermediate fluid chamber 29. Then it runs through the space left between the flow seal seat 24 and the valve contact surface 26, this occurring before leading into the anti-shearing clearance groove 20 after having run through the remaining section of the cooling and lubrication pipe 7.

The fluid 11 can then act in the interstitial space 32 in order to lubricate and cool the entire contact zone formed between the external cylindrical surface 13 and the cylinder 4, before leading to the vicinity of the piston support face 8 to be discharged into the casing of the hydraulic pump with variable-displacement axial pistons 35.

One notes that the total energy lost due to said fluid flow 11 generated intentionally by the hydraulic piston 1 according to the invention remains in all cases low, since the pressure at which said flow operates is low. In contrast to this low energy loss and as explained below, the hydraulic piston 1 according to the invention makes it possible to achieve significant energy savings, in such a manner that the final outcome promotes an increased total yield of the hydraulic pump with variable-displacement axial pistons 35.

FIG. 4 illustrates what occurs when the pressure existing in the hydraulic chamber 5 is high—for example, four hundred bars.

In this case, the force produced by the valve return spring 30 on the low-pressure face 28 of the valve-actuator piston 22 is less than the force produced by the pressure of the fluid 11 on the high-pressure face 23.

It results from this situation that the valve-actuator piston 22 holds the flow seal seat 24 against the valve contact surface 26. Consequently, the sealing contact line 25 is formed and the fluid 11 can no longer circulate in the cooling and lubrication pipe 7.

The seal of the hydraulic chamber 5 is perfect, since the fluid 11 no longer can run through the cut segment 17 or through the cooling and lubrication pipe 7. The hydraulic pump with variable-displacement axial pistons 35 then delivers its maximum yield, since it is both sealed and perfectly lubricated.

The objective is to establish a fluid flow 11 of lubrication and cooling which acts at low pressure in the interstitial space 32 while no leak of said fluid 11 remains at high pressure is thus indeed properly achieved.

One notes that at the low pressure of twenty bars referred to as the "boost" pressure, the fluid flow 11 passing through the flow calibration opening 27 depends in particular on the difference between the pressure to which the compression face 10 is subjected and the pressure to which the piston support face 8 is subjected.

As can be derived easily from FIGS. 3 and 4, said flow also depends on the flow restrictions placed in series in the fluid path 11, which consist successively of the flow calibration opening 27, the space left between the flow seal seat 24 and the valve contact surface 26, and the interstitial space 32.

Moreover, the fluid flow 11 circulating at low pressure in the cooling and lubrication pipe 7 also depends on the tare and the stiffness of the valve return spring 30.

Indeed, in reference to FIG. 3, one understands that that—all other things being the same—the higher the force exerted by the valve return spring 30 on the low-pressure face 28 is, the higher the fluid flow 11 running through the flow calibration opening 27 is, since the space left between the flow seal seat 24 and the valve contact surface 26 is large.

In practice, when the hydraulic pump with variable-displacement axial pistons 35 rotates, and the hydraulic chamber 5 passes cyclically from twenty bars to four hundred bars, the valve-actuator piston assembly 34 however does not come cyclically back in contact with the stop spacer 3.

In fact, still in practical terms, when the pressure existing in the hydraulic chamber 5 is twenty bars, the flow seal seat 24 does not move farther than a distance of a few microns to a few hundredths of a millimeter from the valve contact surface 26. This distance corresponds to the equilibrium found between all the forces present and in particular—in reference to FIG. 3—to the difference between the pressure existing in the hydraulic chamber 5 and the pressure existing in the intermediate fluid chamber 29.

The lubrication and cooling fluid flow 11 which the hydraulic piston 1 with cooling and lubrication valve 2 according to the invention allows to run at low pressure is thus determined during the design of said piston 1, taking into consideration the operating pressures of the hydraulic piston with variable-displacement axial pistons 35, this by selecting in an appropriate manner the cross-section of the high-pressure face 23, the cross-section of the low-pressure face 28, the diameter and the length of the flow calibration opening 27, the tare and the stiffness of the valve return spring 30, and the value of the interstitial space 32.

All these values thus make it possible to determine the threshold pressure existing in the hydraulic chamber 5 beyond which the sealing contact line 25 is formed and below which said flow seal seat 24 remains at a distance from the valve contact surface 26.

It is understandable from the above that the hydraulic piston 1 with cooling and lubrication valve 2 according to the invention easily makes it possible to avoid the compromise imposed by the hydraulic pistons according to the prior art, and the result of which is the diametrical clearance usually left between said pistons and their cylinder 4. Indeed, according to the prior art, said clearance must be sufficiently large to allow sufficient fluid 11 to flow to lubricate and cool said pistons and to limit the losses due to shearing and due to friction, but not so large as to allow too much fluid 11 to escape. The result is a compromise which is eliminated by the hydraulic piston 1 with cooling and lubrication valve 2 according to the invention.

Moreover, one notes that the new opportunities offered by the hydraulic piston 1 with cooling and lubrication valve 2 according to the invention include that the cylindrical body 6 can have an anti-shearing clearance groove 20. This particular configuration shown in FIGS. 1 to 9 is possible, since the seal of the hydraulic piston 1 is no longer ensured by a small clearance left between said piston 1 and the cylinder 4 with which it cooperates, but by sealing means 16 which can be, for example, a cut segment 17 as shown in FIG. 1 to 5 and 7 to 9, or a flexible circular gasket 19 as illustrated in FIG. 6, and this without comprising the proper lubrication and the proper cooling of said piston 1 in its cylinder 4.

Said configuration makes it possible to greatly reduce the losses due to shearing, which the fluid 11 held in the interstitial space 32 generates, when the hydraulic piston 1 moves in the cylinder 4. One notes that the anti-shearing clearance groove 20 is arranged axially in a zone which is not subjected to significant contact pressure between the external cylindrical surface 13 which the cylindrical body 6 presents and the cylinder 4 during the operation of the hydraulic piston 1, and that it has the effect of improving the total energy yield of the hydraulic piston 1 according to the invention and thus the total energy yield of the hydraulic pump with variable-displacement axial pistons 35 according to this non-limiting application example.

In fact, the energy losses due to shearing are approximately inversely proportional to the clearance left between two parts set in a relative movement and between which a fluid film 11 is held. Thus, the anti-shearing clearance groove 20 has the effect of eliminating the losses due to shearing over a very significant length of the external cylindrical surface 13 of the cylindrical body 6.

In order to further improve said yield, one notes—in particular in FIGS. 3 to 7—that the diameter of the axial end of the cylindrical body 6 located on the side of the compression face 10 decreases gradually over a certain length in order to form a bearing taper 21 which, when the hydraulic piston 1 rises in the cylinder 4 in the direction of the hydraulic chamber 5, forces fluid 11 to penetrate between said axial end of the cylindrical body 6 and the cylinder 4 at the level of the contact between said end and said cylinder 4. This particular configuration of the hydraulic piston 1 according to the invention promotes the establishment of a hydrodynamic lubrication regime at the level of said contact and reduces the losses due to friction, which are generated by the displacement of the hydraulic piston 1 in the cylinder 4.

With the same purpose, one notes—in particular in FIG. 2—that the diameter of the axial end of the cylinder 4 located opposite the hydraulic chamber 5 increases gradually over a certain length in order to form a bearing taper 12 which, when the hydraulic piston 1 rises in the piston 4 in the direction of the hydraulic chamber 5, forces fluid 11 to penetrate between the cylindrical body 6 and said axial end of the cylinder 4 at the level of the contact between said end and said cylinder 4.

The possibilities of the hydraulic piston 1 with cooling and lubrication valve 2 according to the invention are not limited only to the applications which have just been described, and it must also be understood that the preceding description was only given as an example and in no way limits the scope of said invention, which would not be exceeded if the embodiment details described were replaced by any other equivalent.

The invention claimed is:

1. A hydraulic piston (1) comprising a cylindrical body (6) which presents an external cylindrical surface (13) housed with little clearance in a cylinder (4) in such a manner as to leave an interstitial space (32) between said surface (13) and said cylinder (4), said piston (1) being capable of moving by translation in said cylinder (4) with which it forms a hydraulic chamber (5) of variable volume, a first end of said piston (1) having a compression face (10) leading into the hydraulic chamber (5) in order to receive the pressure of a fluid (11), while a second end of said piston (3) has a piston support face (8) in order to exert a force onto transmission means (9), said piston (1) comprising:

sealing means (16) arranged on the external cylindrical surface (13), said sealing means (16) being capable of forming a seal with the cylinder (4);

at least one cooling and lubrication pipe (7) which is arranged entirely or partially in the cylindrical body (6), said pipe (7) starting with a pipe inlet (14) which communicates directly or indirectly with the hydraulic chamber (5), and ending with a pipe outlet (15) which opens directly or indirectly at the level of the external cylindrical surface (13), the fluid (11) being capable of circulating in said pipe (7) from said inlet (14) to said outlet (15) when the pressure existing in the hydraulic chamber (5) is greater than the pressure existing in the interstitial space (32), while the sealing means (16) prevent said fluid (11) from passing through an exterior of the cylindrical body (6) in order to run from said inlet (14) to said outlet (15);

at least one cooling and lubrication valve (2) housed entirely or partially in the cooling and lubrication pipe (7) and which can open or close in order to respectively allow or prevent the circulation of the fluid (11) in said pipe (7), said valve (2) comprising a flow seal seat (24) which can either remain at a certain distance from a valve contact surface (26) arranged in an interior or at an end of the cooling and lubrication pipe (7) in order to allow the fluid (11) to pass or can be maintained in contact with said surface (26) in order to form with said surface (26) a sealing contact line (25) which prevents the passage of said fluid (11);

at least one valve-actuator piston (22) which is rigidly connected to the cooling and lubrication valve (2) in such a manner as to be able to maneuver the latter for closing and/or opening, said valve-actuator piston (22) being housed with little clearance in an actuator cylinder (31) arranged in or on the cylindrical body (6), said valve-actuator piston (22) being capable of moving by longitudinal translation in said actuator cylinder (31) and having a high-pressure face (23) exposed to the pressure existing in the hydraulic chamber (5), while, opposite said high-pressure face (23), said valve-actuator piston (22) has a low-pressure side face (28) which communicates directly or indirectly with one or both of the interstitial space (32) and the piston support face (8);

at least one flow calibration opening (27) which limits a maximum flow of fluid (11) which can circulate in the cooling and lubrication pipe (7), said opening (27) being placed—in a path of the fluid (11)—in series with the cooling and lubrication valve (2) and in parallel with the valve-actuator piston (22);

at least one valve return spring (30) which tends to move the flow seal seat (24) away from the valve contact surface (26);

at least one valve stop spacer (3) which sets the maximum distance of separation of the flow seal seat (24) with respect to the valve contact surface (26).

2. The hydraulic piston according to claim 1, wherein the valve return spring (30) is housed entirely or partially in an interior of an intermediate fluid chamber (29) formed between the valve-actuator piston (22) and the sealing contact line (25).

3. The hydraulic piston according to claim 1, wherein the sealing means (16) comprise at least one cut segment (17) housed in at least one sealing groove (18) arranged in the cylindrical body (6) and opening on the external cylindrical surface (13).

4. The hydraulic piston according to claim 1, wherein the sealing means (16) comprise at least one flexible circular gasket (19) housed in at least one sealing groove (18) arranged in the cylindrical body (6) and opening on the external cylindrical surface (13).

5. The hydraulic piston according to claim 1, wherein an anti-shearing clearance groove (20) is arranged in the cylindrical body (6), said groove (20) opening on the external cylindrical surface (13).

6. The hydraulic piston according to claim 1, wherein a diameter of an axial end of the cylindrical body (6) located on the side of the compression face (10) gradually decreases over a certain length in order to form a bearing taper (21).

7. The hydraulic piston according to claim 1, wherein a diameter of an axial end of the cylinder (4) located opposite the hydraulic chamber (5) gradually increases over a certain length in order to form a bearing enlargement (12).

8. The hydraulic piston according to claim 1, wherein the flow calibration opening (27) is arranged in an interior of the valve-actuator piston (22) of which it connects one or both of the high-pressure face (23) and the low-pressure face (28) with the external cylindrical surface of said valve-actuator piston (22).

9. The hydraulic piston according to claim 1, wherein the flow calibration opening (27) consists of the clearance left between the valve-actuator piston (22) and the actuator cylinder (31) with which said valve-actuator piston (22) cooperates.

10. The hydraulic piston according to claim 1, wherein the cylindrical body (6) is run through entirely in the direction of the length thereof by a pipe for lubrication of the transmission means (33) which opens both on the compression face (10) and on the piston support face (8).

11. The hydraulic piston according to claim 1, wherein the cooling and lubrication valve (2) and the valve-actuator piston (22) are made of a same block of material in order to form a valve-actuator piston assembly (34).

12. The hydraulic piston according to claim 11, wherein the valve-actuator piston assembly (34) is run through entirely in the axial direction by the pipe for lubrication of the transmission means (33) around which it can slide while forming a seal with the latter.

13. The hydraulic piston according to claim 12, wherein the valve-actuator piston assembly (34) ends with a sliding sealing end-piece (41) which forms a seal with an end-piece receiving cylinder (42) arranged in the pipe for lubrication of the transmission means (33), said sealing end-piece (41) enabling said assembly (34) to move by longitudinal translation with respect to said pipe (33).

14. The hydraulic piston according to claim 11, wherein the valve-piston assembly (34) is run through entirely in the axial direction by the pipe for lubrication of the transmission means (33), said assembly (34) forming a portion of said pipe (33).

* * * * *